(12) United States Patent
Assadollahi (10) Patent No.: US 8,713,432 B2
(45) Date of Patent: Apr. 29, 2014

(54) DEVICE AND METHOD INCORPORATING AN IMPROVED TEXT INPUT MECHANISM

(75) Inventor: Ramin O Assadollahi, München (DE)

(73) Assignee: Neuer Wall Treuhand GmbH, Hamburg (DE)

( * ) Notice: Subject to any disclaimer, the term of this patent is extended or adjusted under 35 U.S.C. 154(b) by 0 days.

(21) Appl. No.: 12/996,950

(22) PCT Filed: Jun. 10, 2009

(86) PCT No.: PCT/EP2009/004194
§ 371 (c)(1),
(2), (4) Date: Feb. 7, 2011

(87) PCT Pub. No.: WO2009/149924
PCT Pub. Date: Dec. 17, 2009

(65) Prior Publication Data
US 2011/0197128 A1      Aug. 11, 2011

(30) Foreign Application Priority Data
Jun. 11, 2008    (EP) ..................................... 08158079

(51) Int. Cl.
*G06F 17/00* (2006.01)
(52) U.S. Cl.
USPC .......................................... 715/257; 715/259
(58) Field of Classification Search
USPC .......................................... 715/259, 257, 200
See application file for complete search history.

(56) References Cited

U.S. PATENT DOCUMENTS

| | | |
|---|---|---|
| 5,109,352 A | 4/1992 | O'Dell |
| 5,818,437 A | 10/1998 | Grover et al. |
| 5,945,928 A | 8/1999 | Kushler et al. |
| 5,953,541 A | 9/1999 | King et al. |
| 6,005,495 A | 12/1999 | Connolly et al. |
| 6,011,554 A | 1/2000 | King et al. |

(Continued)

FOREIGN PATENT DOCUMENTS

| | | |
|---|---|---|
| CA | 2601859 | 6/2000 |
| CA | 2547143 | 11/2006 |

(Continued)

OTHER PUBLICATIONS

Assadollahi, R., Pulvermu ller, F., 2003. Early influences of word length and frequency: a group study using MEG. NeuroReport 14,1183-1187.

(Continued)

*Primary Examiner* — Manglesh M Patel
(74) *Attorney, Agent, or Firm* — Alston & Bird LLP (57) ABSTRACT

A device and method for its operation comprising a display and input device, a processor to receive character input maintain an input context of words and a dictionary comprising a plurality of word occurrence indicators for selection of candidate words that may follow context words. A word occurrence indicator is associated with a $k_{th}$ order combination of a context word and a candidate word that indicates the frequency by which a respective candidate word follows the corresponding context word by k words in a text corpus. The processor is able to select a list of candidate words where the context word of at least one $k_{th}$ order combination matches the kth last word of input context. A score is determined depending on an associated word occurrence indicator for at least one relevant $k_{th}$ order combination.

20 Claims, 5 Drawing Sheets

(56) References Cited

U.S. PATENT DOCUMENTS

| | | | |
|---|---|---|---|
| 6,185,524 B1* | 2/2001 | Carus et al. ............... 704/9 |
| 6,219,731 B1 | 4/2001 | Gutowitz |
| 6,286,064 B1 | 9/2001 | King et al. |
| 6,307,548 B1 | 10/2001 | Flinchem et al. |
| 6,307,549 B1 | 10/2001 | King et al. |
| 6,405,060 B1 | 6/2002 | Schroeder et al. |
| 6,473,006 B1 | 10/2002 | Yu et al. |
| 6,636,162 B1 | 10/2003 | Kushler et al. |
| 6,646,573 B1 | 11/2003 | Kushler et al. |
| 6,712,534 B2 | 3/2004 | Patel |
| 6,955,602 B2 | 10/2005 | Williams |
| 7,075,520 B2 | 7/2006 | Williams |
| 7,107,254 B1* | 9/2006 | Dumais et al. .......... 706/50 |
| 7,111,248 B2 | 9/2006 | Mulvey et al. |
| 7,319,957 B2 | 1/2008 | Robinson et al. |
| 7,395,203 B2 | 7/2008 | Wu et al. |
| 7,480,619 B1 | 1/2009 | Scott |
| 7,580,829 B2 | 8/2009 | James et al. |
| 7,580,925 B2 | 8/2009 | Unruh et al. |
| 7,587,378 B2 | 9/2009 | Van Meurs |
| 7,610,194 B2 | 10/2009 | Bradford et al. |
| 7,679,534 B2* | 3/2010 | Kay et al. ............... 341/22 |
| 7,712,053 B2 | 5/2010 | Bradford et al. |
| 7,716,049 B2* | 5/2010 | Tian ............... 704/251 |
| 7,720,682 B2 | 5/2010 | Stephanick et al. |
| 7,840,579 B2 | 11/2010 | Samuelson et al. |
| 7,983,902 B2* | 7/2011 | Wu et al. ............... 704/10 |
| 2002/0021311 A1 | 2/2002 | Shechter et al. |
| 2002/0075323 A1 | 6/2002 | O'Dell |
| 2002/0078106 A1 | 6/2002 | Carew et al. |
| 2002/0126097 A1 | 9/2002 | Savolainen |
| 2002/0152203 A1 | 10/2002 | Ostergaard et al. |
| 2002/0163504 A1 | 11/2002 | Pallakoff |
| 2002/0180689 A1 | 12/2002 | Venolia |
| 2002/0196163 A1 | 12/2002 | Bradford et al. |
| 2003/0011574 A1 | 1/2003 | Goodman |
| 2003/0023420 A1 | 1/2003 | Goodman |
| 2003/0030573 A1 | 2/2003 | Ure |
| 2003/0054830 A1 | 3/2003 | Williams et al. |
| 2003/0064686 A1 | 4/2003 | Thomason et al. |
| 2003/0097252 A1 | 5/2003 | Mackie |
| 2003/0104839 A1 | 6/2003 | Kraft et al. |
| 2003/0107555 A1 | 6/2003 | Williams |
| 2003/0144830 A1 | 7/2003 | Williams |
| 2004/0017946 A1 | 1/2004 | Longe et al. |
| 2004/0024584 A1 | 2/2004 | Brill |
| 2004/0056844 A1 | 3/2004 | Gutowitz et al. |
| 2004/0140956 A1 | 7/2004 | Kushler et al. |
| 2004/0153963 A1 | 8/2004 | Simpson et al. |
| 2004/0153975 A1 | 8/2004 | Williams et al. |
| 2004/0176114 A1 | 9/2004 | Northcutt |
| 2005/0017954 A1 | 1/2005 | Kay et al. |
| 2005/0043949 A1 | 2/2005 | Roth et al. |
| 2005/0060448 A1 | 3/2005 | Gutowitz |
| 2005/0114770 A1 | 5/2005 | Sacher et al. |
| 2005/0188330 A1 | 8/2005 | Griffin |
| 2005/0192802 A1 | 9/2005 | Robinson et al. |
| 2005/0283358 A1 | 12/2005 | Stephanick et al. |
| 2005/0283364 A1 | 12/2005 | Longe et al. |
| 2006/0013487 A1 | 1/2006 | Longe et al. |
| 2006/0018545 A1 | 1/2006 | Zhang et al. |
| 2006/0025091 A1 | 2/2006 | Buford |
| 2006/0136408 A1 | 6/2006 | Weir et al. |
| 2006/0158436 A1 | 7/2006 | LaPointe et al. |
| 2006/0167689 A1 | 7/2006 | Maren |
| 2006/0167872 A1 | 7/2006 | Parikh |
| 2006/0173807 A1 | 8/2006 | Weir et al. |
| 2006/0190256 A1 | 8/2006 | Stephanick et al. |
| 2006/0190447 A1 | 8/2006 | Harmon et al. |
| 2006/0206313 A1* | 9/2006 | Xu et al. ............... 704/10 |
| 2006/0236239 A1 | 10/2006 | Simpson et al. |
| 2006/0242576 A1 | 10/2006 | Nagel et al. |
| 2006/0247915 A1 | 11/2006 | Bradford et al. |
| 2006/0256139 A1 | 11/2006 | Gikandi |
| 2006/0259479 A1 | 11/2006 | Dai |
| 2007/0074131 A1 | 3/2007 | Assadollahi |
| 2007/0094718 A1 | 4/2007 | Simpson |
| 2007/0106785 A1 | 5/2007 | Tandon |
| 2007/0203879 A1 | 8/2007 | Templeton-Steadman et al. |
| 2007/0216651 A1 | 9/2007 | Patel |
| 2007/0285397 A1 | 12/2007 | LaPointe et al. |
| 2008/0034081 A1 | 2/2008 | Marshall et al. |
| 2008/0072145 A1 | 3/2008 | Blanchard et al. |
| 2008/0076472 A1 | 3/2008 | Hyatt |
| 2008/0126314 A1* | 5/2008 | Thorn ............... 707/3 |
| 2008/0138135 A1 | 6/2008 | Gutowitz |
| 2008/0154576 A1 | 6/2008 | Wu et al. |
| 2008/0159841 A1 | 7/2008 | Keller |
| 2008/0167858 A1* | 7/2008 | Christie et al. ............... 704/10 |
| 2008/0189605 A1 | 8/2008 | Kay et al. |
| 2008/0195388 A1 | 8/2008 | Bower et al. |
| 2008/0235003 A1 | 9/2008 | Lai et al. |
| 2008/0244446 A1 | 10/2008 | LeFevre et al. |
| 2008/0263015 A1 | 10/2008 | Qiu et al. |
| 2008/0266263 A1 | 10/2008 | Motaparti et al. |
| 2008/0288665 A1 | 11/2008 | Williams |
| 2008/0291059 A1 | 11/2008 | Longe |
| 2009/0037371 A1 | 2/2009 | Unruh et al. |
| 2009/0055732 A1 | 2/2009 | Motaparti et al. |
| 2009/0092323 A1 | 4/2009 | Qiu et al. |
| 2009/0150383 A1 | 6/2009 | Qiu et al. |
| 2009/0154682 A1 | 6/2009 | Qiu |
| 2009/0306969 A1 | 12/2009 | Goud et al. |
| 2010/0121876 A1 | 5/2010 | Simpson et al. |
| 2010/0122164 A1 | 5/2010 | Kay et al. |
| 2010/0161538 A1 | 6/2010 | Kennedy, Jr. et al. |
| 2010/0174529 A1 | 7/2010 | Bradford et al. |
| 2010/0188338 A1 | 7/2010 | Longe |

FOREIGN PATENT DOCUMENTS

| | | |
|---|---|---|
| EP | 0930760 | 7/1999 |
| EP | 1347361 | 9/2003 |
| EP | 1347361 A1 | 9/2003 |
| EP | 1724692 | 11/2006 |
| GB | 2399202 | 9/2004 |
| WO | 2005036413 | 4/2005 |
| WO | 2006080927 | 8/2006 |
| WO | 2006080935 | 8/2006 |
| WO | 2008034112 | 3/2008 |

OTHER PUBLICATIONS

Jones, P. E., Virtual keyboard with scanning and augmented by prediction, Proc 2nd European Conference on Disability, Virtual Reality and Associated Technologies, (University of Reading, UK, 1998), 45-51.

Hollis Weber, "Taming Microsoft Word 2002", 122 Pages, published on Oct. 10, 2002.

Potipiti, T., Sornlertlamvanich, V., & Thanadkran, K. (2001). Towards an intelligent multilingual keyboard system. Paper presented at the Human Language Technology Conference (HLT 2001), Mar. 18-21, 2001, San Diego.

B. Y.-L. Kuo et al.; "Tag Clouds for Summarizing ~~eb Search Results" W\~t~ Conference 2007, [Online] May 8, 2007,-May 12, 2007 XP002496297 Banff, Alberta, Canada.

Berhard Delphine, Multilingual term extraction from domain-specific corpora using morphological structure, Published 2006, ACM, pp. 171-174, EACL '06 Proceedings of the Eleventh Conference of the European Chapter of the Association for Computational Linguistics.

Rosner Daniela et al., Tag Clouds: Data Analysis Tool or Social Signaller?, Published 2008, IEEE pp. 33-42, Proceedings of the 41st Hawaii International Conference on System Sciences.

Assadollahi, R; Pulvermu,ller; 2003, Early Influences of Word Length and Frequency: A Group Study Using MEG NeuoReport 14, 1183-1187.

(56) References Cited

OTHER PUBLICATIONS

Sam A. Inverso, Nick Hawes, John Kelleher, Rebecca Allen and Ken Haase "Think and Spell: Context-Sensitive Predictive Text for an Ambiguous Keyboard Brain-Computer Interface Speller" Biomedzinische Technik, [online] D vol. 49, No. 1 Sep. 2004.

Tom Stocky, Alexander Faaborg, Henry Lieberman "A Commonsense Approach to Predictive Text Entry" Proceedings of Conference on Human Factors.

Pereira et al., Beyond word N-grams. In David Yarovsky and Kenneth Church, editors, Proceedings of the Third Workshop on Very Large Corpora, pp. 95-106, Somerset, New Jersey, 1995.

Berard C., Neimeijer D. Evaluating effort reduction through different word prediction systems. Proceedings of the IEEE International Conference on Systems, Man and Cybernetics, La Haye NL. vol. 3, pp. 2658-2663. Oct. 2004.

Manning, C. D. et al., *Foundations of Statistical Natural Language Processing*, MIT Press, Cambridge, Massachusetts (1999) 191-228.

International Search Report and Written Opinion for Application No. PCT/EP2009/004194 dated Sep. 9, 2009.

European Search Report for Application No. 08158079.7 dated Nov. 25, 2008.

\* cited by examiner

DEVICE AND METHOD INCORPORATING AN IMPROVED TEXT INPUT MECHANISM

The present application is the U.S. national stage under 35 U.S.C. §371 of a foreign Patent Cooperation Treaty application, PCT/EP2009/004194 filed on Jun. 10, 2009, which claims priority from European patent application 08158079.7 filed Jun. 11, 2008.

The present invention relates to a device incorporating an improved text input mechanism, a method for improved text input and computer program for performing the method. More particularly, the present invention relates to a device such as a personal digital assistant or cellular telephone which incorporates a method for contextual prediction of the next word of text to be input. The method of the present invention minimizes the number of keystrokes necessary to input text.

The use of miniature computers such as personal digital assistants (PDA) and cellular devices capable of text messaging has become increasingly popular. Such miniature devices include correspondingly miniature sized input mechanisms. Typically PDA's and the like utilize a miniature keyboard or a multi-tap data entry mechanism. The miniature size of the input mechanism makes it impractical to enter large amounts of text, and it is desirable to minimize the number of keystrokes necessary to enter text.

Prior approaches for minimizing the number of keystrokes have focused on so-called disambiguating methods in which the system refines its guess of the text being entered as the user enters each letter of text. U.S. Pat. Nos. 5,818,437, 5,953,541 and U.S. patent publication numbers 20020152203, 20020163504, and 20020126097 are representative of the state of the prior art.

The prior art approach is akin to thumbing through a dictionary. The system "flips" to the appropriate section of the dictionary once the initial letter is entered, and displays words beginning with the initial letter. Due to limitations in the size of the display, only the first n words are displayed. If the desired word happens to occur within the first n words then the user may select the desired word from the list of n words.

If the desired word does not appear, then the user enters the second letter, whereupon the system displays words beginning with the first two letters. If the desired word occurs within the displayed list of n words then the user may select the desired word from the list.

If the desired word does not appear, then the user enters the third letter, whereupon the system displays words beginning with the first three letters. The user continues to enter letters until either the desired word is displayed in the list of n words or the word is fully entered.

The aforementioned approach has not sufficiently reduced the number of keystrokes. Within European patent application EP1724692 an improved method for predictive text input has been disclosed. This method uses bigrams or trigrams for predictive text input. Bigrams determine the frequency or the probability of a possible next word taking into account one preceding word. Trigrams go one step further and determine the frequency (probability) of a possible next word, while taking into account the two preceding words. From a mathematical point of view, assuming that exact probabilities are determined, bigrams (trigrams) determine the a-posteriori probability for a next word given the one (two) preceding word(s).

Most prior art algorithms are actually only using bigrams and add as a side note that also trigrams could be used for predicting the next word in a given context. However, for obtaining a list of next words, also referred to as a list of candidate words, there are serious limitations for both approaches, when it comes to implementing them on real consumer products. Bigrams tend to be too unintelligent, i.e. their prediction results do not take into account sufficient context in order to provide satisfactory lists of candidate words on a reliable basis. On the other hand, trigrams are too large and too big to estimate in a reliable way. Just consider the example of a dictionary of 10,000 words. The total number of theoretically possible bigrams is $10^8$, while the total number of theoretically possible trigrams is already $10^{12}$. Apart from requiring significant processing power and memory requirements, an extremely large training corpus would be required, in order to obtain reliable trigram frequency data.

Another aspect is the size of the list of candidate words. By way of example, on a sufficiently large corpus of training words, the word "the" has 13,800 followers, i.e., 13,800 bigrams would have non-zero frequency values and consequently the list of candidate words should contain 13,800 words. Such a high number of candidate words is way too much for the user to choose from, thereby making the use of bigrams for next word prediction questionable. Trigrams would address the problem of being more specific to the textual context, but need large storage capacity as well as very large corpora to train. In a mobile phone, where storage and computing power are constrained, the application of trigrams is not feasible.

Moreover, trigrams may lead to very specific predictions and cannot predict words that would be fitting the textual context but which did not occur in the training corpus. This means that due to their specificity trigrams are not able to generalize and to easily generate novel word combinations.

The present invention formulates a method that reduces the amount of storage needed, leads to dynamic predictions and also requires only reduced computing power compared to conventional trigram prediction methods. It is ideal for resource constrained environments such as mobile phones and other portable devices. It combines relatively lower computational complexity of bigrams with the higher contextual precision of trigrams. Furthermore, the method reduces the number of keystrokes necessary to enter text in particular in handheld devices such as mobile phones and PDAs.

According to an aspect of the invention, a device comprising a display screen, e.g., for displaying m-words and an input device for entering characters is disclosed. Various embodiments of display screens and input devices, such as touch screens and others, are possible and outlined at a later stage. The device further comprises a processor receiving characters from the input device. Furthermore, the processor maintains an input text context comprising K words directly preceding a desired word, wherein K is greater than one. The context or precursor of a desired or intended word may comprise the K words that a user has entered just prior to the desired word. At the beginning of a text or when the device is turned on, the input context may be shorter than K words or completely absent causing the device to predict the desired word on such shorter context. The input context may thus be initialized by the processor upon activation of the device. Furthermore, the device comprises a dictionary comprising a plurality of word occurrence indicators associated with $k^{th}$ order combinations of context and candidate words. A $k^{th}$ order combination may indicate the frequency by which the respective candidate word follows the context word by k words in a training text corpus. The value k may vary from 1 to K so that the dictionary may comprise word occurrence indicators for word combinations that follow each other by 1 to K words. The dictionary may be stored in memory, e.g. non-volatile memory, on the device.

A score is determined depending on the associated word occurrence indicator for the at least one matching $k^{th}$ order combination. Preferably, the score is determined as a combination of the matching word occurrence indicators in case that several combinations of different orders match the present context.

The processor then causes m-number of candidate words from said list of candidate words having the highest score to be displayed on said display screen.

For that purpose, it is beneficial to sort the candidates according to their respective score. Further, the processor causes the display to prompt the user to select one of the displayed candidate words as the desired word or to enter at least one character for identifying the desired word using the input device.

The dictionary may be structured in K sub-dictionaries, wherein the $k^{th}$ sub-dictionary contains the $k^{th}$ order combinations and the associated word occurrence indicators. In an embodiment these may be a plurality of entries, with each entry including a one-word index representing the context word, the candidate word and the associated word occurrence indicator indicating the frequency that the candidate word follows the index by k words in the text corpus. Alternatively, a global wordlist or dictionary may be provided that comprises possible candidate words, preferably a complete list of candidate words from the above K sub-dictionaries. In this case, the $k^{th}$ sub-dictionary and/or the $k^{th}$ order combinations do not contain candidate words, but rather a pointer or index to the respective candidate word in the global wordlist or dictionary. In other words, the $k^{th}$ sub-dictionary and/or the $k^{th}$ order combinations contain in such cases a first index to the global dictionary indicating the one-word context, a second index to the global dictionary indicating the candidate word and an associated word occurrence indicator indicating the frequency that the candidate word follows the one-word context by k words in a text corpus. Providing a global dictionary and using indexes or pointers to this global dictionary to construct the sub-dictionaries may be beneficial, notably with respect to the usage of memory resources.

The dictionary may be created using a sufficiently large training text corpus. In addition, the dictionary may adapt itself to the preferences of the user by continuous training based on the text entered by the user or by corpuses provided by the user (e.g. sent email, text documents, chat logs and the like). By way of example, the word occurrence indicators of the dictionary may be frequency values, score values, probability values, or other values indicating that a candidate word has a certain occurrence in a particular context. It should be noted that the entries of the sub-dictionaries may also be structured in such a way that each index word, i.e. context word, is associated with a plurality of candidate words and their respective index word-candidate word occurrence indicators. It may be beneficial to store in a data entry the plurality of relevant candidate words and the respective occurrence indicators for one particular index or context word. Alternatively, a plurality of pointers or indexes to a global dictionary indicating the candidate words may be stored.

In order to predict the desired word, the processor selects a list of candidate words, wherein for each candidate word the context word of a corresponding $k^{th}$ order combination matches the $k^{th}$ last word of the current input context. Furthermore, for each candidate word a score is determined depending on its occurrence indicator(s) in the relevant $k^{th}$ order combination(s). The relevant $k^{th}$ order combinations comprise the respective candidate word and the context word which precedes the desired word by k words. For this selection process, k may vary from 1 to K. For a given input context comprising K words, some candidate words may yield $k^{th}$ order combinations for all values of k from 1 to K, while other candidate words may only have $k^{th}$ order combinations in the dictionary for some values of k, or even for a single k.

If the dictionary is organized in sub-dictionaries as outlined above, the selection of candidate words may be described as follows: The processor selects a list of candidate words from said dictionary, wherein for each candidate word the one-word index of the $k^{th}$ sub-dictionary matches the $k^{th}$ last word of the context. A score for each candidate word is determined depending on its respective occurrence indicator or frequency in the K sub-dictionaries.

The processor then causes m-number of candidate words from said list of candidate words to be displayed on said display screen. Furthermore, it causes the display to prompt the user to select one of the displayed candidate words as the desired word or to enter at least one character for identifying the desired word using the input device. In some embodiments the candidate words are displayed on the display screen in an order corresponding to their respective score. It may be beneficial for the ergonomic behavior of the device that the processor may cause the display screen to display only candidate words whose score exceeds a threshold value.

According to another aspect of the invention, the processor causes k to vary from 0 to K. In the latter case, the 0th sub-dictionary or the 0th order word combinations comprise identical index/context and candidate words with associated occurrence indicators indicating the frequency of the candidate word in a text corpus. The case Ic=0 is also called the unigram or one-gram case for which the occurrence indicator of a candidate word may indicate the usage probability of that word for a particular user and/or within a text corpus, regardless of the context. This dictionary will be referred to as the unigram dictionary and it comprises occurrence indicators associated to candidate words, indicating the frequency of the candidate word in a text corpus. This unigram dictionary may be the global wordlist or dictionary mentioned above and may be referred to by indexes/pointers from the sub-dictionaries or from the $k^{th}$ order combinations.

It should be noted that candidate words may not necessarily be contained in all K sub-dictionaries and/or K corresponding $k^{th}$ order combinations. In such cases, in order to determine the score of the candidate word from the occurrence indicators of the sub-dictionaries only the occurrence indicators from those sub-dictionaries are considered for which a candidate word entry exists. For those sub-dictionaries that do not contain the particular candidate word an occurrence indicator of 0 or any other small value may be assumed.

According to a further aspect of the invention, the processor updates, in response to the selection of the desired word, the input context by appending the desired word to the end of the context and deleting the leading word. The processor then proceeds to select a new list of candidate words according to the prediction method outlined in this invention. Furthermore, it causes the display to prompt the user to either select one of the displayed candidate words or to enter at least one character for identifying the desired word using the input device. Alternatively, the processor causes, in response to the entering of at least one character for identifying the desired word using the input device, only those candidate words from the list of candidate words to be displayed whose initial character or characters (if more than one character have been entered) match the at least one character entered using the input device.

According to an aspect of the invention, the score of a candidate word is determined by adding the candidate word occurrence indicators of the up to K corresponding sub-dictionary entries and/or K corresponding $k^{th}$ order combinations, each occurrence indicator being weighted by a weight multiplier. The weight multipliers may be used to take into account the different importance of the K words within a context for the prediction of the desired word. By way of example, the weight multipliers may be decreasing with increasing values of k, or the weight multipliers may have equal values.

In order to take into account different (training) corpus sizes of different fractions of the dictionary, it may be beneficial to normalize the occurrence indicators used for the two-word combination entries composed of the index/context word and the candidate word. The occurrence indicators may be normalized to the size of the text corpus used to train the dictionary and/or they may be represented by a logarithmic value, e.g. a logarithmic value of the frequency. In a similar manner the score values which are determined by combining the occurrence indicators or frequencies of identical two-word combination entries from the k sub-dictionaries may be normalized.

The objects and features of the invention will become apparent from the following description of preferred embodiments. The present invention is described in the following by referring to exemplary embodiments illustrated schematically in the accompanying figures, wherein.

The present invention provides an efficient method for inputting text, and is particularly suited for cellular telephones, handheld computers such as personal digital assistants, and other devices requiring data entry. The present invention is indifferent to the specific method for inputting text. Text may be entered using a keyboard, a virtual keyboard such as a touch screen, a so-called Graffiti style of writing popularized by the PALM® operating system, or any other man-machine interface.

The basic concept underlying the present invention is that the next item of text is predicted based on the preceding word or words of text. Furthermore, non-linguistic contexts (such as the identification of a text field as "address field") may be used to predict words.

Figure 1:
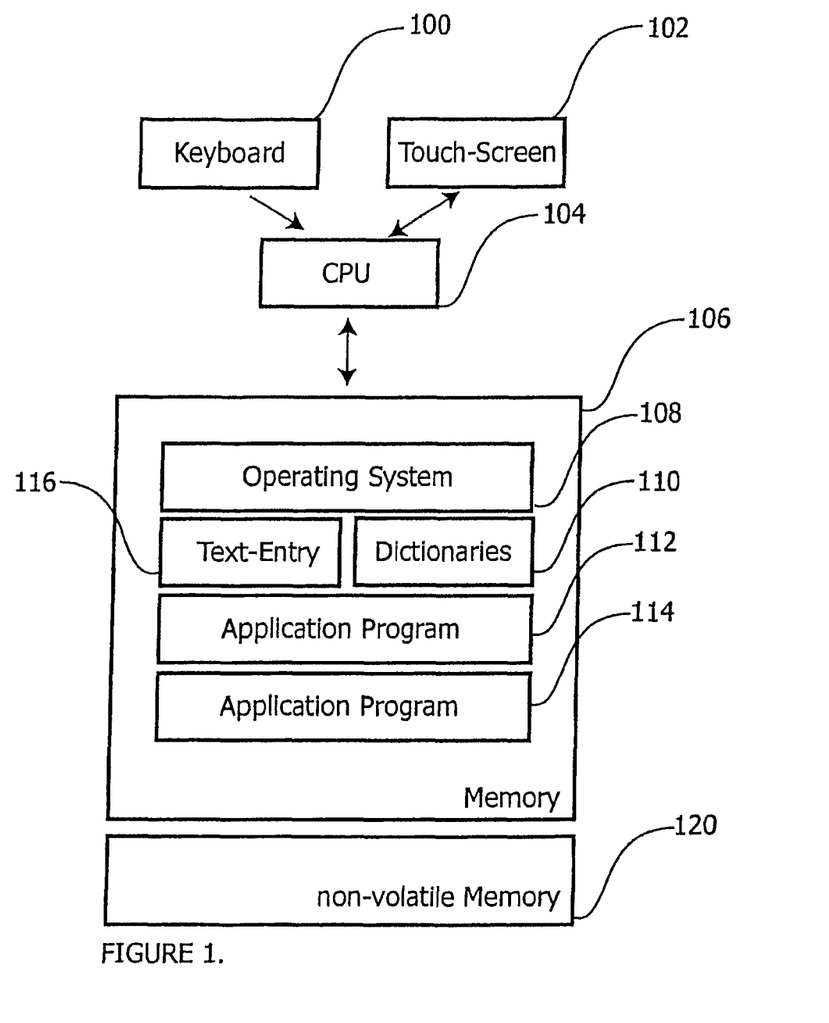
FIG. 1 is a block diagram of a device including the predictive data entry mechanism of the present invention.

According to a first embodiment, the system provides a list of candidate words for the next word of text based on the preceding word or delimiter. However, as will be explained below, the present invention may readily be adapted to predict the next word based on preferred combinations of preceding words or delimiters and/or linguistic analysis thereof. FIG. 1 is a block diagram of the operating environment of the present invention. The system 10 of the present invention includes an input device 100 which may be a keypad, keyboard, touch sensitive screen or the like which hereinafter will be referred to as keyboard 100. The system 10 further includes a display 102 for displaying the text entered as well as an m word list of predicted candidate words. The screen may be an LCD screen or the like, and in the case of a touch sensitive screen the display 102 may serve a dual purpose both as a display and as the keyboard 100. The present invention will work with any means for inputting text, and any means for displaying text.

As further illustrated in FIG. 1, the system 10 includes a processor or central processing unit (CPU) 104 which executes commands via an operating system 108. The system 10 may include a plurality of application programs 112, an application for decoding handwriting into text 116, an application which displays text 114 and one or more dictionaries 110. It should be appreciated that the text recognition application 116, the display application 114, and one or more of the dictionaries 110 may be implemented as firmware or microcode stored on a nonvolatile memory 120 such as an EPROM, EEPROM or the like.

Use of the term "software" throughout this disclosure should be interpreted to include software implemented through firmware and stored on a non-volatile memory medium. The present system may be realized as software or firmware or the like, architecturally located between the operating system 108 of the computer 104 and the application 112 that receives text as input, e.g. a word processor. The system 10 may be language specific and have one or more dictionaries or vocabulary modules. The dictionary 110 and keyboard 100 may be language specific. The software may allow for switching dictionaries and switching languages.

A key aspect of the invention relates to its ability to predict the next word the user will input based on the preceding words or delimiters which will hereinafter be referred to as the input context or precursor. It is notable that the context may also arise from the type of application receiving the text or the type of text field receiving the text. In the first case, the application may give a hint to what kind of style the user will use (SMS, short message service: colloquial writing vs. word processor: formal writing). In the second case, unique identifiers may be assigned to certain text fields such as "name", "address", etc. This information may be used to activate a different dictionary containing names, addresses, cities etc.

The system 10 predicts the next word the user will enter based on the context, and displays a list of candidate words. The number of candidate words displayed is dependent upon the size and resolution of the display (the screen's real estate), and the font size in which the text is displayed. Moreover, the system 10 may optionally be configured to only display candidate words whose score exceeds a threshold value, further limiting the number of candidate words displayed.

Figure 2:
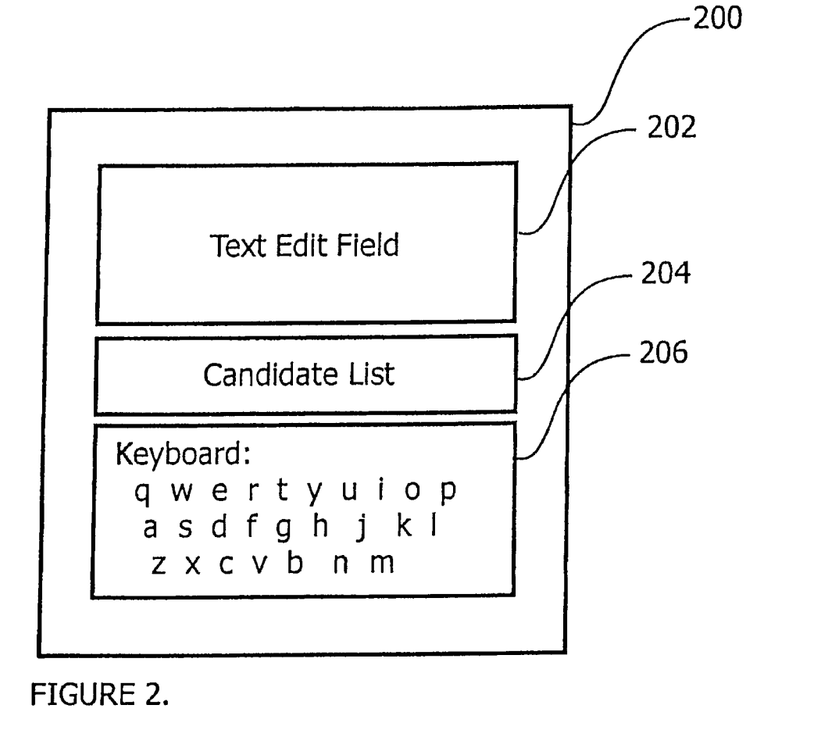
FIG. 2 shows a sample device including the predictive data entry mechanism of the present invention.

FIG. 2 is a block diagram of an illustrative device 200 employing the system 10 of the present invention. The device 200 includes a display having a text edit field 202 showing a text string entered or selected by the user. The display further includes a field 204 displaying a list of candidate words, and optionally a field 206 displaying a virtual keyboard.

Figure 3:
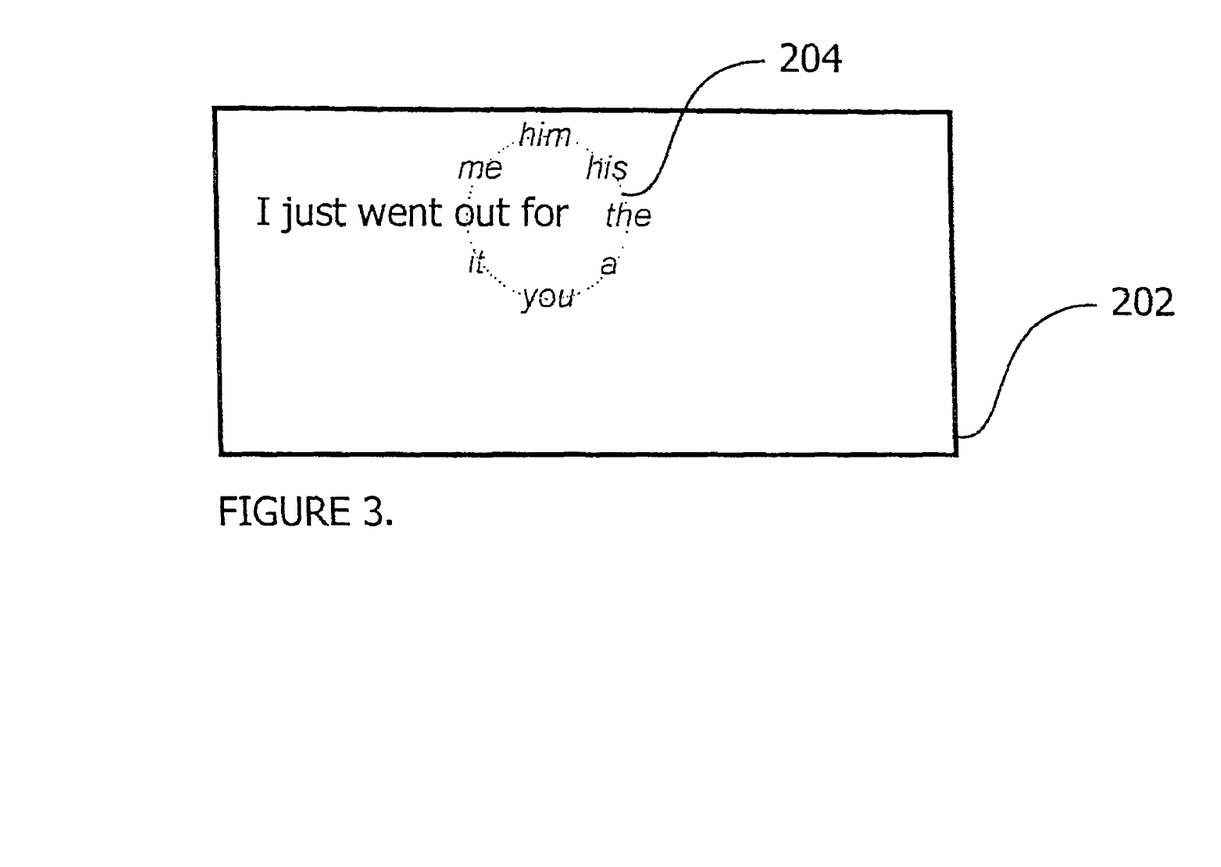
FIG. 3 shows one method of displaying candidate words.

It is important to note that the field 204 may take different forms of presentation. For example, it may be realized as a circle on which the words are presented. This is illustrated in FIG. 3. This field or circle 204 may follow the position in the text where the current input is directed to (this is called cursor which usually takes the visual form of a blinking vertical bar). For the sake of simplicity and in order to abstract from the particular implementation, the structure that is presented to the user will be termed "list" in the following.

One of the important aspects of the invention is that the list of candidate words is context dependent. The system 10 selects candidate words by looking at the immediately preceding word or words which will be termed precursor. The number of words defining a precursor may vary. It should be understood that the term "word" as used throughout the specification refers to a conventional word of text and to a delimiter such as a space, a period, a comma, a semi-colon and the like.

As will be described below in further detail, the system may iteratively reduce the size (measured in words) of the precursor in order to obtain a desired number of candidate words. For example, a three word precursor may only provide two candidate words. If the display has room for 10 words, the system may obtain additional candidate words by reducing the size of the precursor. A two word precursor may for example have four corresponding candidate words, and a one word precursor may have ten corresponding candidate words. This iterating approach can be easily combined with the text prediction method outlined in this document.

According to an embodiment, the system 10 includes at least one dictionary 110 including a list of candidate word entries; each candidate word entry includes an index and a candidate word. It should be understood that a given precursor may have many candidates. Thus, the same index may appear in multiple candidate word entries in the dictionary. For example the precursor "the" is likely to have many candidates. Each candidate word entry further includes a score indicative of the frequency of occurrence. Optionally, the score may be a normalized number between 0 and 1.

As will be explained below, the dictionary may store a plurality of candidate word entries. In the particular embodiment, each candidate word entry includes an index/context word, a candidate word, and a frequency or a score or in more general terms an occurrence indicator. In contrast to prior art, the present invention does not require dictionaries that store candidate word entries having two or more word indexes, as would be required with conventional trigram systems. As outlined above, such dictionaries rapidly become extremely complex and large. Instead the present invention stores multiple dictionaries, also referred to as sub-dictionaries, that store candidate word entries having one index, but which result from one word precursors having different anteriority, i.e. having a different number of intermediate words between the one word precursor and the candidate word.

In conventional text prediction systems bi-grams or two word combinations in which the precursor is the immediately preceding word (or delimiter) are used. In a tri-gram implementation the precursor would consist of the two immediately preceding words (or word/delimiter combination). Similarly, in a four-gram system the precursor would consist of the three immediately preceding words. The present invention provides a method for next word text prediction that yields the benefits for prediction drawn from the extended textual context, but at the same time avoids the significant drawbacks of tri-grams, four-grams, etc. related to their complexity.

The dictionary 110 includes a plurality of candidate word entries; each candidate word entry includes an index/context word, and a candidate word. The index is the key used to access the "candidate" word(s). It should be appreciated that a single precursor may have multiple candidate words. In the present invention, the index is one word or delimiter in length, in contrary to prior art systems where the index may consist of two or more words.

As noted above, each entry in dictionary 110 includes a score indicative of the frequency of occurrence, i.e. the frequency in which the user uses the phrase. A given precursor may have multiple candidate words, and the score associated with each candidate word may or may not be the same.

Each time the user enters (or selects) a precursor, the system 10 searches the dictionary 110 for corresponding candidate words. The system 10 ranks the candidate words according to their score or frequency, and displays the first m number of candidate words in field 204. The system 10 may treat the initial state before any word has been entered in the same way it reacts when the precursor is a delimiter such as a period. In this manner the system 10 may be configured to provide candidate words in the initial state before the user has entered a first character of the text.

The system 10 may be self-training in the sense that new phrases and their corresponding scores may be dynamically added to the dictionary 110. Moreover, the score of existing phrases may dynamically update to reflect changes in the frequency of usage.

According to a preferred embodiment, the system 10 is provided with a robust dictionary 110 such that the full benefit of the system is immediately available to the user. Moreover, if the system 10 permits the score of existing phrases to dynamically update, then the dictionary 110 will self-optimize to reflect the style, diction, and vocabulary of the user. Thus, even if the dictionary 110 is initially empty, the system 10 will compile its own dictionary reflective of the user's vocabulary, diction and style.

An initial dictionary 110 may be compiled by examining a body of training or learning text called corpus for two-word phrases, and ranking the frequency of the two-word phrases. Furthermore, as will be outlined in more detail, additional dictionaries 110 or sub-dictionaries may be compiled by examining a body of text for two-word phrases, for which the words are apart from each other by a certain number of intermediate words. Ideally, the body of text used to compile the dictionary will contain a rich vocabulary and varied examples of style and diction.

The system 10 is especially useful for languages for which it is complex to input words, e.g. Chinese. The system 10 may thus operate on full symbols or on morphemes (one or more morphemes make up a word of a language) or even on syllables (e.g. Hiragana or Katakana in Japanese). In the following, the inventive method for generating dictionaries and using them for text prediction is disclosed in more detail. As mentioned above, by way of example, there may be 13,800 words following the word "the". The question is when a system should learn all these and how a user should choose from them? If one considers a dictionary containing 70,000 words of vocabulary, there are on the average approx. 9.2 words following each one of them. Consequently, a prediction system would have to learn, and the user would have to teach the system, 70000*10 contexts, when only considering bigrams. Even if the teaching of one context would only take one second, it would still require 194 hours to teach the system all possible contexts.

By way of example, the following two sentences are considered:

1) "The apple is tasty."
2) "The car is broken."

It is assumed that prediction algorithms are trained using text and that in this particular situation the sentences above are the only two sentences of the training corpus. Consequently, a bigram method would propose the words "tasty" and "broken" to follow after the word "is". Given that a bigram method is used that counts frequencies of co-occurrence, then "tasty" and "broken" would both have the frequency 1. As "tasty" would have been learned first, it would be ranked higher in the list of these two words with the same frequency and therefore would probably occur first in the candidate list followed by "broken". When using the predictive text solution based on bigram frequencies, this would clearly lead to unwanted predictions such as the word "tasty" after a string of words like "The car is".

A prior art approach to circumvent these types of misspredictions is to use trigrams. A trigram would represent that the word "tasty" follows the two word context "apple is" while the word "broken" follows the two word context "car is".

However, there are two fundamental drawbacks in actually using trigrams for real world applications. First of all, as noted by Christopher D. Manning and Hinrich Schütze (2002). Foundations of statistical natural language processing", p. 193-194, MIT Press, Cambridge Mass., there must be very large corpuses of training text, usually about 8 trillion words (for a human being with a 20000 word vocabulary), to have a good statistical estimate for the trigram. This may be feasible for English or Spanish where sufficient databases of electronic text are available. However, today predictive text entry systems are used for many languages, among which may be exotic ones, notably in the field of mobile phones, PDA, etc., and often sufficiently large training corpuses would not be available, Consequently, the practical use of trigrams in products, such as mobile phones, is rather limited today. The second drawback of using trigrams is the amount of memory that is necessary to store the trigrams on the respective device. This becomes apparent when considering the mathematical example outlined above indicating the number of theoretically possible trigrams.

The method outlined here significantly reduces the amount of memory and processing power required. It reduces the memory footprint for predicting words from $p^3$ for trigram to $2p^2$ which is very similar to the memory consumption of bigrams ($p^2$), where p represents the size of the used vocabulary.

In the following the method for generating a dictionary for the new prediction algorithm is outlined. In a first step, it is determined which words can be the followers, hence called the afters or after-words, of a given word and by what frequency. Furthermore, it is determined which words can occur two words after the given word, hence called the afterafters or afterafter-words. By way of example, in the sentence "I was singing aloud." the word "was" is the after of the word "I", while the word "singing" is the afterafter of the word "I". The word "singing" is the after of the word "was" and the afterafter of "I"; "aloud" is the after of "singing" and the afterafter of the word "was". In this way, information about what words can immediately follow a particular word and what words can follow two words after a particular is collected. It should be noted that this information is not the same as the information collected by trigrams as there is no knowledge about the combination of two words that can be followed by a third one. Table 1 lists the possible "after" and "afterafter" word combinations for the above mentioned sentence.

TABLE 1

| word | "after" | "afterafter" |
|---|---|---|
| I | was | singing |
| was | singing | aloud |
| singing | aloud | . |
| aloud | . | |
| . | | |

The disclosed method could be extended by collecting more information, like the third word following the given word or the fourth word following the given word etc.

In general terms, one could describe the disclosed method step as to determine the possible two-word combinations of a given word with a word following k words later, where k is a natural number greater zero. From a contextual perspective, it could be expected, that the significance for text prediction of such combinations tends to decrease with an increasing value of k.

Together with the information about what word can follow in the respective context, i.e. what two-word combinations are possible, the absolute frequency of the two-word combinations is stored so that words can be ranked according to their context frequency. Table 2 shows an example of such a ranking for the word "I", i.e. the index, collected on a small training corpus. The list of after-words corresponds to a list of candidate words which follow directly the index "I", whereas the afterafter-words correspond to a list of candidate words which follow the index "I" with one intermediate word. It can be seen that the frequency of the after-word combinations and the frequency of the afterafter-words differ quite substantially for this particular example. In the particular example, the word frequency is represented by the number of hits encountered during the training phase.

TABLE 2

| "after" - word frequency | "after" - word | "afterafter" - word frequency | "afterafter" - word |
|---|---|---|---|
| 2400 | was | 2619 | to |
| 2109 | have | 1519 | the |
| 1886 | am | 1492 | a |
| 1593 | don't | 1085 | that |
| 1450 | think | 1034 | , |
| 1207 | had | 988 | it |
| 975 | can | 912 | . |
| 916 | know | 738 | have |
| 850 | would | 666 | not |
| 677 | just | 650 | I |
| 608 | will | 575 | you |
| 587 | do | 538 | my |
| 576 | could | 492 | like |
| 522 | didn't | 482 | know |
| 505 | did | 474 | in |
| 495 | can't | 461 | think |
| 492 | got | 401 | be |
| 470 | love | 387 | this |
| 460 | thought | 386 | up |
| 460 | want | 347 | him |
| 423 | really | 286 | about |
| 392 | went | 285 | been |
| 386 | feel | 285 | want |
| 347 | guess | 254 | get |
| 342 | like | 248 | do |
| 335 | get | 241 | out |
| 293 | should | 239 | on |
| 268 | believe | 234 | really |
| 268 | also | 232 | at |
| 262 | mean | 216 | say |
| 253 | wanted | 215 | so |
| 241 | said | 212 | just |
| 235 | need | 211 | no |
| 229 | told | 207 | for |
| 229 | hope | 196 | some |
| 224 | saw | 194 | with |
| ... | ... | ... | ... |

It should be noted that, as already outlined above, also sentence or punctuation marks, i.e. delimiters, may be collected and considered for the two-word combinations. They may be stored as words that are taken into account as words in a precursor. By this means the system can also predict the beginning of sentences, with the immediate preceding word being, e.g., a period ".", and the system may for example provide better suggestions after questions, with the immediate preceding word being a "?". Furthermore, delimiters may also be candidate words predicted based on the textual context. This is shown in Table 2, where the delimiters "," and "." are possible "afterafter"-words of the word "I".

Taking into account that the method could be further extended to two-word combinations which are in general k words apart, the method could be described in general terms as to determine the frequencies of two-word combinations from a corpus of training words, wherein the two-word combinations comprise two words that are k words apart from each other. The frequencies are determined for two-word combinations from 1 up to a maximum number K, where K is a natural number greater zero. This way a dictionary 110 for word prediction could comprise K sub-dictionaries, each for a set of two-word combinations, having k=0 K–1 intermediate words between them.

In a second step, the word frequencies may be modified through different procedures. They may be normalized to a certain training corpus size. Alternatively or in addition, one may logn the word frequencies and one may rank them. These procedures will make the frequencies more similar to each other, as is the case when calculating the logarithmic value or when ranking, and/or they will make the frequencies more similar to other dictionaries in a different language, as is the case for normalization. Table 3 shows an extracted list of normalized frequencies for the above-mentioned example.

TABLE 3

| "after" - word frequency | "after" - word | "afterafter" - word frequency | "afterafter" - word |
|---|---|---|---|
| 8 | was | 8 | to |
| 8 | have | 8 | the |
| 8 | am | 8 | a |
| 8 | don't | 7 | that |
| 8 | think | 7 | , |
| 7 | had | 7 | it |
| 7 | can | 7 | . |
| 7 | know | 7 | have |
| 7 | would | 7 | not |
| 7 | just | 7 | I |
| 7 | will | 7 | you |
| 7 | do | 7 | my |
| 7 | could | 7 | like |
| 7 | didn't | 7 | know |
| 7 | did | 7 | in |
| ... | ... | ... | ... |

It is important to note that such procedures that turn the absolute frequencies into more similar numbers changes the nature of the afters because they are not bigrams in the strict sense anymore.

The data generated in the second step can then be stored in a dictionary, possibly comprising sub-dictionaries, in order to be processed on a device that uses predictive text entry methods. In the following, the processed and stored frequencies of these contexts will be referred to as normalized frequencies. Once the normalized frequencies of a corresponding "after" and "afterafter" are combined in a mathematical way, the result will be referred to as "score".

In the following, a method for predicting a word based on the dictionaries that have been obtained from the above-mentioned method will be described. The method collects all words that are on the left side of the current cursor position in a text input line and tries to predict the words that will most likely occur after the cursor. The method does so by combining the (normalized) frequencies of "afters" and "afterafters" into a score. Thus every word that is either in the afters and/or in the "afterafters" will get a score. The word candidates that are to be presented will be these candidate words ranked by their respective score. By way of example, the possible "afters" of the full stop punctuation mark "." can be taken as possible word candidates without further computation. Possible candidates to follow the punctuation mark "." are the words a sentence is usually started with.

If there are two words before the cursor in the present context, referred to as $W_{-2}$ and $W_{-1}$, then the possible "afterafters" of $W^{-2}$ should be combined with the possible "afters" of $W_{-1}$. Most often there will be words in the list of "afterafters" of $W_{-2}$ that also occur in the list of "afters" of $W_{-1}$ and a combination of their (normalized) frequencies will lead to a movement in their ranking. Thus, the two words prior to the cursor will influence the list of candidate words and they do so in a more context sensitive way compared to bigrams and a less memory consuming way compared to trigrams.

Another advantage of the present invention is the generation of candidates for contexts that were never seen before. This is exemplified in the next paragraphs.

For the example mentioned above comprising a corpus of two sentences, i.e. "The apple is tasty." vs. "The car is broken." the dictionaries comprising the list of candidate words and frequencies are easy to compute by hand when both of the sentences are processed to a database as described above. The "afters" of the word "is" are the words "tasty" and "broken" with a frequency of 1. However, the "afterafters" of the word "apple" contains only one word, namely the word "tasty", with a frequency of 1, whereas the "afterafters" of the word "car" contains a different single word namely the word "broken", also with a frequency of 1.

One way of combining the (normalized) frequencies of "afters" and "afterafters" is to add them. For a context reading "The apple is" the frequencies would add up to a score of 2 for the candidate word "tasty" and to a score of 1 for the candidate word "broken". Thus a ranked list of candidate words for this context would be the word "tasty" followed by the word "broken". For the context "The car is" the ranked list of candidate words would be the word "broken" followed by the word "tasty" as the word "tasty" would receive the score 1 from the frequency of the after-word "is", while the word "broken" would have the score 2 from the frequency of the after-word "is", which is 1, and the frequency of the afterafter-word "car", which is also 1.

Note that compared to bigram models, the present invention leads to a different ranking of the two candidate words "broken" and "tasty". Compared to trigram models the present invention leads to a second candidate "broken" for the context "The apple is". This would not have been possible for trigrams since "apple is broken" was not in the training context. This shows that predictions can be more precise compared to bigram models and more versatile compared to trigram models.

Figure 4:
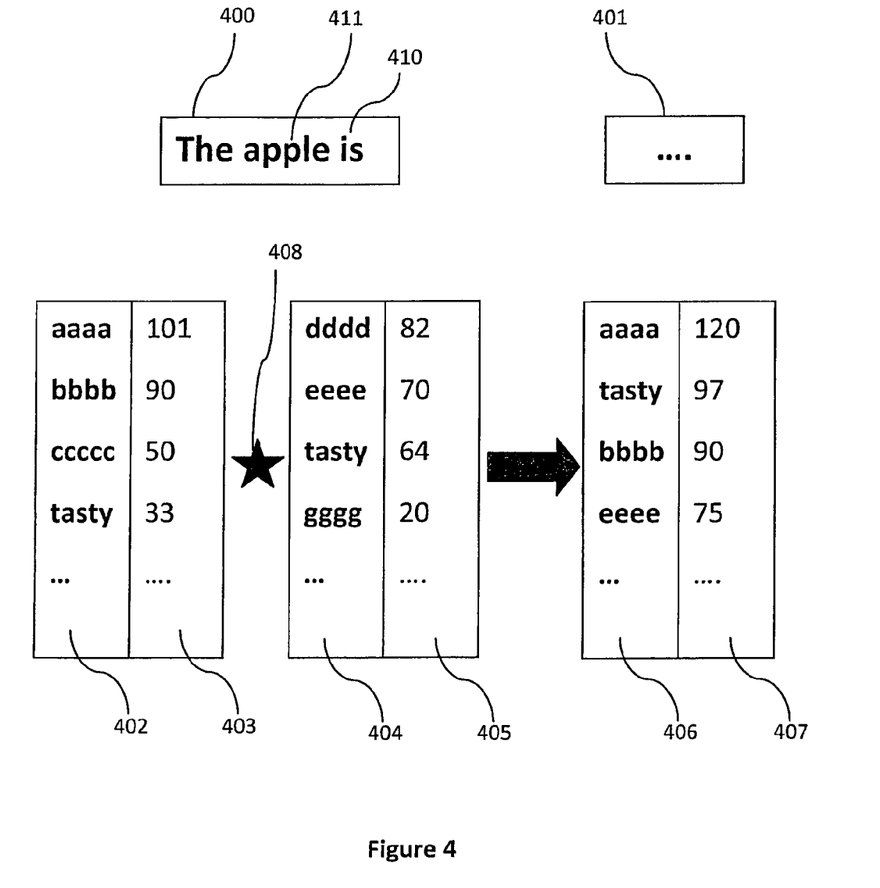
FIG. 4 illustrates a textual context and the different elements used by the present invention.

For further clarity, FIG. 4 illustrates the disclosed text prediction method. The purpose of the method is to predict a next word 401 from its contextual context 400. For this purpose a first list of candidate words 402 with associated frequencies 403 is generated for the last word 410 preceding the to be predicted word 401. In the wording above, this first list of candidate words 402 is referred to as the afters. Furthermore, as second list of candidate words 404 with associated frequencies 405 is generated for the last but one word 411 preceding the to be predicted word 401. This second list of candidate words 404 is referred to above as the afterafters. The two lists of candidate words 402 and 404 are generated from a dictionary, possibly comprising sub-dictionaries, that has been trained as outlined above and that has been made available to the text prediction system.

In order to determine an overall list of candidate words 406 for the word 401, the two lists 402 and 404 and their respective (normalized) frequencies 403 and 405 are combined through an operation 408. This combination results in a score 407 for every single word in the overall list of candidate words 406.

The above example uses the mathematical operation of addition for computing the score out of the (normalized)

frequencies. There are other possibilities of computing the score using the frequencies without leaving the scope of the invention. A further example of how to combine the two frequencies into a score may be a formula such as:

score=$(c_{-1}*f-1)+(c_{-2}*f_{-2})$, where $f_{-1}$ and $f_{-2}$ are the (optionally normalized) frequencies of $W_{-1}$ and $W_{-2}$ respectively and where $c_{-1}$ and $c_{-2}$ are weight factors. By choosing the weight factors accordingly, this formula may be used to give the normalized frequency of $W_{-1}$, i.e. the afters, more influence to the score than the normalized frequency of $W_{-2}$, i.e. the afterafters. Thus the designer of the predictive text input system may vary the influence of the two contexts on the resulting score.

It is important to note that the above example comprising afters and afterafters is only one example of how to integrate (optionally normalized) frequencies from previous information into scores for a list of candidate words that are ranked dynamically.

Furthermore, it should be noted that the disclosed method can also be extended to the usage of two-word combinations that are up to K words apart, as highlighted above. In such cases, the text prediction system would consider the K words preceding the to be predicted word, i.e., $W_{-1}, W_{-2}, \ldots, W_{-K}$. Using a predetermined dictionary, comprising K sub-dictionaries, K lists of candidate words and their respective (normalized) frequencies $f_{-1}, f_{-2}, \ldots, f_{-K}$, would be determined. These K lists and their respective frequencies would then be combined to provide an overall list of candidate words and related overall scores. As each of these K lists of candidate words is based on a bigram-like dictionary, the complexity of the resulting algorithm still is in the order of magnitude of traditional bigram text prediction systems.

FIG. 5 illustrates an embodiment of the invention based on a depicted example for inputting text. FIG. 5a shows an example display of a text input device according to the invention. The display is arranged similar to the embodiment shown in FIG. 2. The top part of the display represents a text edit field displaying a text string entered by the user. The middle part displays a list of candidate words. The lower part of the display represents a virtual keyboard. The virtual keyboard is optional and used for illustrative purpose. Alternatively, a hardware keyboard having a plurality of keys may be employed for text input. FIG. 5a shows the initial state of the input procedure. The text edit field is empty and a list of words with which the user most frequently starts a sentence is displayed as candidate list. This list may be based on a unigram prediction method. If the intended sentence starts with one of these displayed candidate words, the user must simply select the respective word, e.g., by operating a pointing device to move a cursor to the intended word and activating the word by clicking on it or pushing an 'ok'-key (FIG. 5b). The selected word is then displayed in the text edit field. Next, a new candidate list is presented (FIG. 5c). The candidates are selected from the dictionary based on the current context. In general, the candidates are words that best fit the current context. Depending on the statistical model applied, the context in this state will be the previously selected word as precursor in case K=I, or the marker for the beginning of a sentence (e.g. the period character '.') and the previously selected word (T in the shown example) for K=2. Again, the user can select one of the candidates as the desired word to be added to the text edit field. That way, the input text forms word by word. This procedure is repeated until the end of the input text. In the best case, a whole sentence can be entered by selecting only candidate words. This leads to only one stroke or click per word and enhances usability.

Figure 5A:
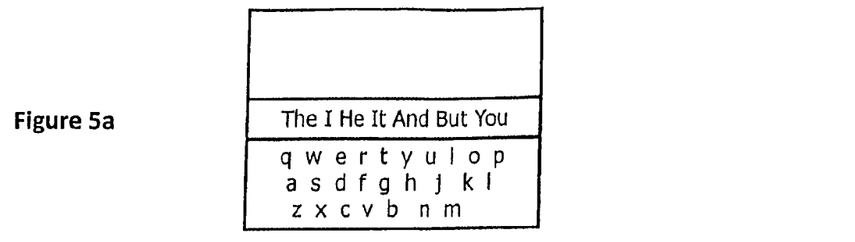
FIG. 5 illustrates the operation of an embodiment of the invention.
Figure 5B:
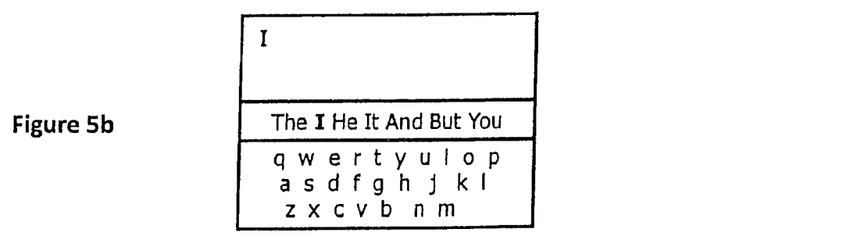
Figure 5C:
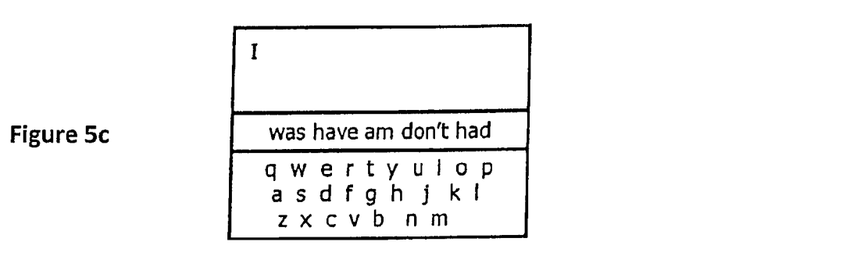
Figure 5D:
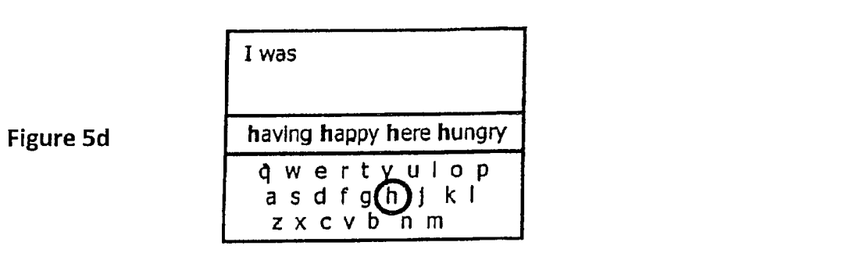

If the intended word is not in the candidate list, the user can strike one of the keys on the keyboard or select a letter from the virtual keyboard with the pointing device. A new set of candidates will be listed that begin with the selected letter (FIG. 5d). The new candidates are selected from the dictionary based on their likelihood and/or score. For instance, the highest ranking candidate words starting with the selected letter(s) and matching the context may be selected and displayed. Higher ranking candidate words starting with different letters are suppressed. Alternatively, the most frequent unigram or one-gram words irrespective of the context may be selected and displayed. Both methods may further be combined, e.g. if not enough candidate words starting with the selected letter(s) for the present context are available. Then, frequent words matching the initial letter(s) may be filled in the displayed candidate list. Preferably, the words in the candidate list are sorted according to their scores, the more likely ones at the left (or right) side of the display. This simplifies the selection of a candidate as the more likely ones can be selected with fewer strokes or clicks.

Figure 5E:
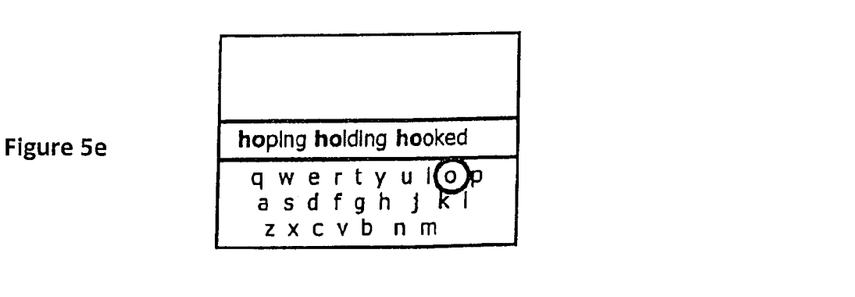

More letters can be entered, thus further constraining the list of candidates (FIG. 5e). Preferably, the list of candidates is re-sorted according to the word scores and/or likelihoods when the list is further constrained based on additional letters. In most cases, the intended or desired word is displayed with only a few input letters and can be selected by the user. If there is no matching candidate and the user enters a "space"-character (or any other designated special character), the system may enter a teach mode where the new word may be learned and added to the dictionary. In the future, the new word will appear in the list of candidates and can easily be selected. Thus, the system is adaptive and learns the vocabulary of the user.

The above example uses a QWERTY-type of keyboard, either virtual or real. Of course, other types of keyboards can be used as well. For instance, a handwriting recognition or a telephone type of keypad commonly applied in mobile phones, wireless communication devices, PDAs (personal digital assistance) or other portable and/or handheld devices can be used. For these keypads (sometimes referred as 'touch tone1 or DTMF keypads), the digit keys are assigned with a plurality of letters each. For instance, the digit '2' has assigned the letters 'A', 'B', 'C' of the alphabet. The user presses the '2'-key to input that he/she wants to select either 'A', 'B' or 'C' (or 'a', 'b', 'c' if the system differentiates between lowercase and uppercase letters). The present invention will then restrict the selected candidates to words that match either of the letters associated with the pressed key. These constraints for the candidates are not that strong as if only one letter would be selected, but due to the text prediction capabilities based on the word context as applied by the invention, in most instances, it is still possible to narrow down the candidate list to only a few displayed candidates, which allows the user to easily select the intended word. In most cases, the number of available candidates will go down rapidly to a single candidate with only a few keystrokes, even if the keys are not unambiguously assigned to individual letters. The user then only has to confirm that the remaining candidate is the intended word, or activating a designated key for entering the learning mode if the intended word is not displayed.

As already mentioned, most mobile phones do often not provide a full keyboard or touch screen. On mobile phones, the candidate word may be selected by a pointing device, such as a joystick or wheel, or by pressing a key having multiple characters associated. If the intended word is not suggested at first glance (that is displayed in the candidate list), the user can normally evoke it by pressing one of the digit keys in much the same way as in conventional single-tap text entry systems (i.e. the correct letter is proposed by only striking the corresponding digit key once). However, while conventional single tap systems construct a word letter-by-letter from the dictionary, the present invention selects it from the most probable candidates for the current context. Thus, the user gets words proposed immediately after entering the first key and at a higher probability of predicting the correct word.

The present invention is described in the general context of method steps, which may be implemented in one embodiment by a computer program product including computer-executable instructions, such as program code, executed by one or more computers, e.g. in networked environments. Generally, program modules include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps. The present invention can be implemented directly in software using any common programming language, e.g., C/C++ or assembly language. This invention can also be implemented in hardware and used in consumer devices. It should also be noted that the words "component" and "module" as used herein and in the claims are intended to encompass implementations using one or more lines of software code, and/or hardware implementations, and/or equipment for receiving manual inputs.

The present invention is not limited to the disclosed exemplary applications. Other applications can benefit from the invention as well. This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art.

The invention claimed is:

1. An apparatus comprising at least one processor having a memory communicatively associated with said processor, the memory comprising computer executable instructions which, when executed by the processor, cause the apparatus to perform:

receiving character input from an input device;

maintaining an input context comprising K words directly preceding a desired input word, wherein K is greater than or equal to two;

providing a dictionary comprising a plurality of word occurrence indicators, wherein a word occurrence indicator is associated with a $k_{th}$ order combination of a context word and a candidate word that indicates the frequency by which a respective candidate word follows the corresponding context word by k words in a text corpus without regard to any word in between the context word and the candidate word, wherein k takes on each of a value between 1 and K inclusively;

selecting a list of candidate words, wherein for each candidate word the context word of at least one $k_{th}$ order combination matches the $k^{th}$ last word of the input context;

determining a score depending on the at least one associated word occurrence indicator for the at least one relevant $k_{th}$ order combination;

causing a number of candidate words from said list of candidate words having the highest score to be displayed on a display screen; and prompting the user to select one of the displayed candidate words as the desired word or to enter at least one character for identifying the desired word using the input device.

2. The apparatus according to claim 1, wherein the score is determined as a combination of the matching word occurrence indicators.

3. The apparatus according to claim 1, wherein the input context comprises linguistic delimiters, such as sentence or punctuations marks.

4. The apparatus according to claim 1, wherein the dictionary is organized in K sub-dictionaries, wherein the $k_{th}$ sub-dictionary comprises the $k_{th}$ order combinations.

5. The apparatus according to claim 1, wherein the $k_{th}$ order combinations are stored as pointers to a global word dictionary comprising the context and/or candidate words.

6. The apparatus according to claim 5, further comprising instructions that cause the apparatus to perform: compiling a unigram dictionary comprising occurrence indicators associated to candidate words, indicating the frequencies of the respective candidate words in a text corpus.

7. The apparatus according to claim 6, wherein the unigram dictionary is the global dictionary.

8. The apparatus according to claim 1, wherein in response to the selection of the desired word, said processor is operable to update the input context by appending the desired word to the end of the input context and deleting the leading word;

select a new list of candidate words according to claim 1; and cause the display to prompt the user to either select one of the displayed candidate words or to enter at least one character for identifying the desired word using the input device.

9. The apparatus according to claim 1, wherein in response to the entering of the at least one character for identifying the desired word using the input device, said processor is operable to cause only those candidate words from the list of candidate words to be displayed whose initial at least one character match the at least one character entered using the input device.

10. The apparatus according to claim 1, wherein the candidate words are displayed on the display screen in an order corresponding to their respective score.

11. The apparatus according to claim 1, wherein the score of a candidate word is determined by adding the occurrence indicators of matching $k_{th}$ order combinations, each occurrence indicator being weighted by a weight multiplier.

12. The apparatus according to claim 11, wherein the weight multipliers are decreasing with increasing values of k.

13. The apparatus according to claim 1, wherein the occurrence indicators are normalized corresponding to the size of the text corpus.

14. The apparatus according to claim 1, wherein the occurrence indicators are represented by a logarithmic value.

15. The apparatus according to claim 1, wherein the processor is operable to cause the display screen to display only candidate words whose score exceeds a threshold value.

16. A method comprising:
maintaining an input context comprising K words directly preceding a desired word, wherein K is greater than or equal to two;
providing a dictionary comprising a plurality of word occurrence indicators, wherein a word occurrence indicator is associated with a $k_{th}$ order combination of a context word and a candidate word that indicates the frequency by which a respective candidate word follows the corresponding context word by k words in a text corpus without regard to any word in between the context word and the candidate word, wherein k takes on each of a value between 1 and K inclusively;
selecting a list of candidate words, wherein for each candidate word the context word of at least one $k^{th}$ order combination matches the $k^{th}$ last word of the input context;
determining a score depending on the at least one associated word occurrence indicator for the at least one relevant $k_{th}$ order combination;
causing a number of candidate words from said list of candidate words to be displayed on the display screen; and
prompting the user to select one of the displayed candidate words as the desired word or to enter at least one character for identifying the desired word.

17. The method of claim 16 further comprising:
the score is determined as a combination of the matching word occurrence indicators.

18. The method of claim 16 wherein:
the score of a candidate word is determined by adding the occurrence indicators of matching $k_{th}$ order combinations, each occurrence indicator being weighted by a weight multiplier.

19. The method of claim 16 wherein:
the weight multipliers decrease with increasing values of k.

20. A computer program product comprising a non-transitory computer readable medium having stored therein computer executable instructions, said instructions when executed causing an apparatus to perform:
maintaining an input context comprising K words directly preceding a desired word, wherein K is greater than or equal to two;
providing a dictionary comprising a plurality of word occurrence indicators, wherein a word occurrence indicator is associated with a $k_{th}$ order combination of a context word and a candidate word that indicates the frequency by which a respective candidate word follows the corresponding context word by k words in a text corpus without regard to any word in between the context word and the candidate word, wherein k takes on each of a value between 1 and K inclusively;
selecting a list of candidate words, wherein for each candidate word the context word of at least one $k^{th}$ order combination matches the $k^{th}$ last word of the input context;
determining a score depending on the at least one associated word occurrence indicator for the at least one relevant $k_{th}$ order combination;
causing a number of candidate words from said list of candidate words to be displayed on the display screen; and
prompting the user to select one of the displayed candidate words as the desired word or to enter at least one character for identifying the desired word.

\* \* \* \* \*